April 4, 1961    R. S. WILLIS    2,977,617
PIG BALL INJECTOR
Filed Aug. 28, 1959
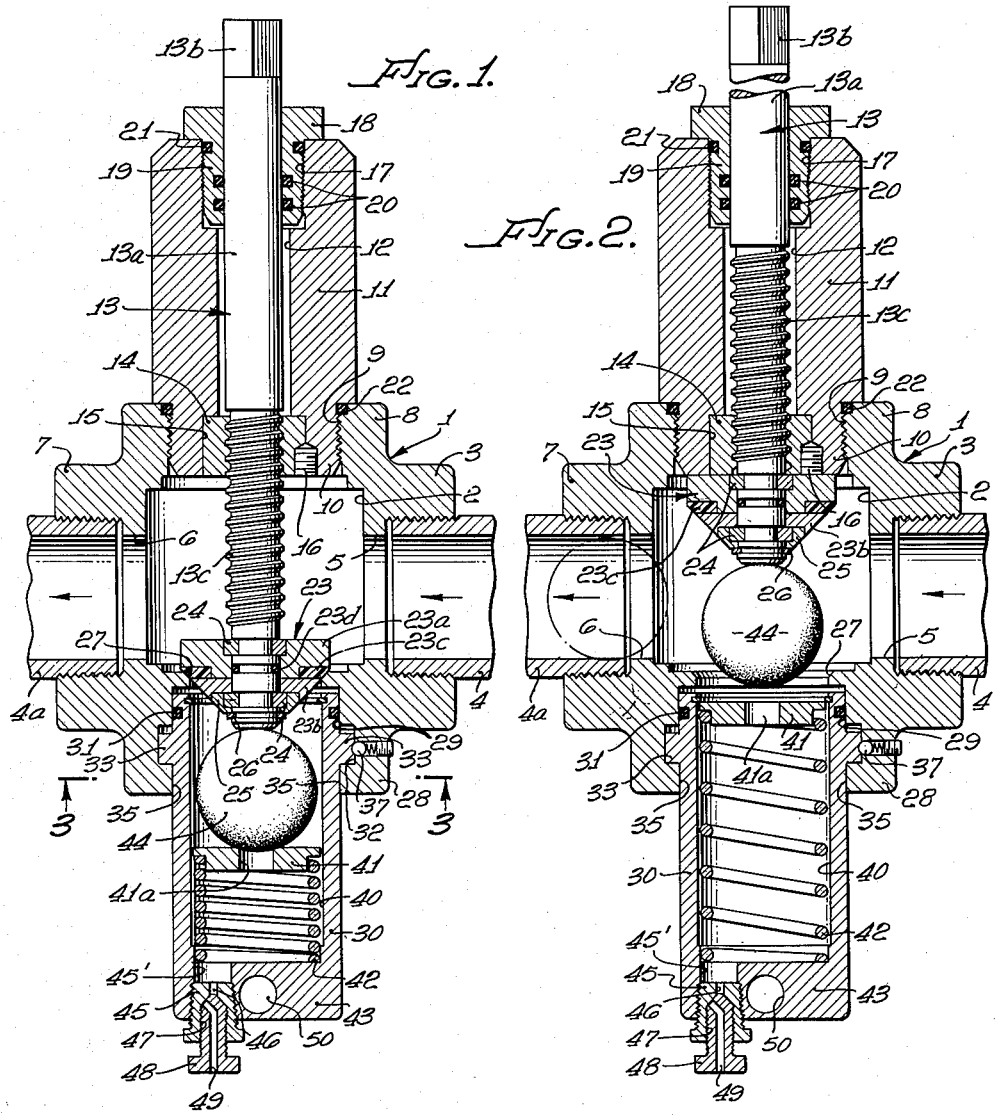
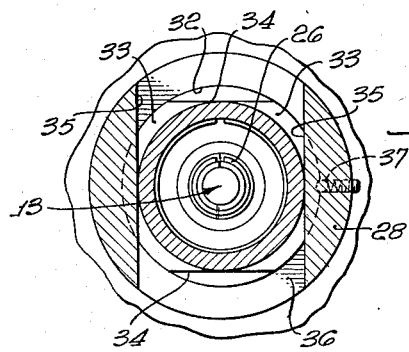
ROBERT S. WILLIS,
INVENTOR.
BY Paul A. Weilein
ATTORNEY.

United States Patent Office 2,977,617
Patented Apr. 4, 1961

2,977,617

PIG BALL INJECTOR

Robert S. Willis, 4341 Olive, Long Beach, Calif.

Filed Aug. 28, 1959, Ser. No. 836,712

6 Claims. (Cl. 15—104.06)

The present invention relates to pig ball injectors and more particularly to a combined valve and pig ball injector.

Frequently it becomes desirable to inject into a flow line as, for example, a flow line leading from an oil well to a collector tank, "pig" balls or other objects which are adapted to travel through the pipe line along with the fluid passing therethrough so as to force deposits which may be collected on the flow line wall along with the fluid passing through the line, thus removing any blockage which may have occurred by reason of the solid deposits. For example, flow lines from wells frequently are troubled wit paraffin deposits which interfere with the free flow of fluid through the lines. Removal of the paraffin from the flow lines is conventionally accomplished by the use of pig balls which are injected into the line and pass through the line forcing the paraffin deposits before them.

An object of the present invention is to provide a pig ball injector which is extremely simple to manufacture and which is combined with a valve mechanism in such a manner that the pig ball may be injected without occasioning interruption of the flow of fluid through the line.

Another object of the invention is to provide a pig ball injector which is economical to manufacture, install and maintain and which may be very easily operated.

In accordance with the foregoing objective, a main housing part is provided which is adapted to constitute a coupling in the flow line. At one side of this housing is a pig ball injector of an extremely simple construction which is removably carried by the housing so as to enable a pig ball to be deposited into the injector. The housing also carries a valve mechanism for closing the opening in the housing through which the ball passes from the injector, whereby the injector may be removed from the housing for loading with a ball, and upon reapplication and opening of the valve the ball is automatically displaced from the injector into the flow line.

Other objects and advantages of the invention will be hereinafter described or will become apparent to those skilled in the art, and the novel features of the invention will be defined in the appended claims.

Referring to the drawing:

Fig. 1 is a sectional view through the pig ball injector and valve of the present invention showing the injector loaded with a ball for injection into a flow line and showing the valve in a closed position;

Fig. 2 is a view similar to Fig. 1 but showing the valve opened and the pig ball displaced from the injector into the main housing of the device for passage into the flow line; and Fig. 3 is a view in section as taken on the line 3—3 of Fig. 1.

Like reference characters in the several views of the drawing and in the following description designate corresponding parts.

Referring first to Fig. 1, the injector of the invention comprises a valve housing generally designated 1 having an internal valve chamber 2. At one side of the housing 1 it is provided with an internally threaded neck 3 for connection with a flow line 4, there being a bore 5 in the neck 3 leading into the valve chamber 2. Leading from the valve chamber 2 in the housing or body 1 is another port or bore 6 leading to an internally threaded neck 7 which is also adapted for connection to a flow line section 4a. Accordingly, it will be noted that the housing or body 1 virtually constitutes a coupling in a flow line. The housing or body 1 is also provided with a neck 8 which is internally threaded as at 9 for reception of the reduced threaded end 10 of an elongated valve support 11. Extending through the support 11 is a bore 12 in which is rotatably extended a valve operator stem 13. The stem 13 has a smooth cylindrical section 13a and an outer extremity 13b formed for the reception of a tool as by the provision of a hexagonal or squared end thereon. The stem 13 is also provided with a threaded section 13c which is threadedly engaged with a bushing 14 disposed in a counterbore 15 in the support 11, and secured in place as by a screw 16 which engages both the bushing 14 and the support 11 so as to retain the bushing 14 in the counterbore 15.

At its outer extremity the support 11 is bored and tapped as at 17 for the reception of a centering and packing nut 18 having an elongated body 19 sealed as by O-rings 20 to the stem 13 and as by means of O-rings 21 to the support 11. The support 11 is also sealed in relation to the neck 8 as by an O-ring 22 engaged between the latter.

On the inner end of the valve stem 13 is a rotatably mounted valve head 23 which is secured in place on the valve stem 13 between a pair of split bushings 24, 24 as by means of a retainer collar 25 and a split retainer ring 26 seating in a peripheral groove in the stem 13. The bushings 24, 24, for assembly purposes, are preferably composed of semi-circular half-sections. The head 23 is composed of a pair of annular members 23a and 23b which are held assembled between the bushings 24, the valve head part 23a being formed with a seat for an annular resilient seating element 23c. An O-ring or other appropriate seal 23d seals the head 23 against leakage between the latter and the valve stem 13.

Within the housing or body 1 at the base of the valve chamber 2 is a seat 27 with which the seating member 23c is engageable. Extending from the body or housing 1 in alignment with the support 11 is a neck 28 having a bore 29 adapted to receive a hollow injector housing 30, the inner extremity of which closely fits in the bore 29 and is sealed therein as by means of an O-ring 31 or the like. The neck 28 is provided with a circumferentially extending slot or groove 32 at its inner periphery for reception of a pair of arcuate flanges 33 projecting from the outer periphery of the injector housing 30, these flanges 33 being interrupted as best seen in Fig. 3 as at 34, 34 by flat tangential surfaces whereby when the injector housing 30 is rotated 90° from the position shown in the drawing, the flat tangential faces 34, 34 will pass between the opposed parallel faces 35, 35, resulting from the formation of a diametrical slot 36 across the outer end of the neck 28.

Thus it is observed that the injector housing 30 is removably connected to the housing 1 as by means of a bayonet slot-type connector. In order to prevent inadvertent 90° rotation of the injector housing, spring loaded detent means in the form of a ball detent 37 carried by the neck 28 and engageable with one of the flanges 33 is preferably provided.

Within the injector body 30 is a bore 40 in which is slidably disposed a follower 41. The follower 41 is spring loaded as by a coiled compression spring 42 engaged with the follower 41 at one end and with the end wall 43 of the housing 30 at the other end so as to urge the follower 41 away from the end wall 43. In a manner hereinafter to be described, the follower will displace a pig ball designated 44 from the injector housing 30 into the valve chamber 2.

In the end wall 43 of the housing 30 is a threaded plug 45 disposed in a bore 45' and having a vent passage 46 therethrough. The plug 45 is tapped and threaded as at 47 to receive a bleeder valve 48 ported as at 49 with the port leading to the conical end of the bleeder valve 48 so as to be closed off upon engagement with the conical surface at the base of the bore 47 in the plug 45 as is clearly shown in Figs. 1 and 2.

Preferably extending transversely through the end wall 43 is an opening 50 for the reception of a tool enabling ease of rotation of the housing 30 to the 90° displaced position for removal from the housing or base 1.

In the use of the injector device thus far described, the housing 30 of the injector will be loaded with a pig ball 44 as shown in Fig. 1. This may be readily accomplished inasmuch as it will be observed that the valve head 23 seating on the seat 27 effectively precludes the passage through the seat 27 of fluids passing through the valve chamber 2. Thus, any pressure in the injector housing 30 may be bled off through the bleeder valve 48 following which the injector housing 30 may be rotated 90° and removed from the body 1, and a pig ball 44 disposed in the injector housing 30 so as to partially compress the spring 42. The loaded injector housing is then reapplied to the body 1 so that the spring 42 biases the pig ball 44 into engagement with the inner extremity of the valve stem 13 as shown in Fig. 1. When it is desired to inject the pig ball 44 into the vlave chamber 2 for passage along with fluid flowing through the valve chamber into the flow line 4a, it is only necessary to engage the end 13b of stem 13 and rotate the latter in a counterclockwise direction so as to retract the valve head 23 to the position shown in Fig. 2, at which time the spring 42 will urge the follower 41 along with the valve head so that the pig ball 44 will be effectively displaced from the injector housing 30 into the valve chamber 2, and fluid passing through the latter will transfer the pig ball 44 from the full line position shown in Fig. 2 to the broken line position shown in this view, where it is effectively in the flow line 4a.

It should be noted that the follower 41 is of a diameter slightly less than the inside diameter of the housing 30 and is provided with a central aperture 41a, so that when the valve means is open, fluid pressure acts on both sides of the follower to facilitate injection of the pig ball by the spring 42.

Passage of the ball through the flow line will effectively remove paraffin or other solid deposits or sediment from the line and force the same ahead of the pig ball, and the pig ball may be recovered from the flow line by means of a pig ball recovery device as particularly disclosed and claimed in my co-pending application Serial No. 836,711 filed concurrently herewith.

While specific structural details of the invention have been herein shown and described, it should be understood that changes and alterations may be resorted to without departing from the spirit of the invention as defined in the appended claims.

I claim:

1. A pig ball injector device comprising: a body having a valve chamber therein; said body having means connectable to flow lines leading into and out of said valve chamber; a valve support at one side of said valve chamber; said body having a valve seat in the side of said chamber opposite said one side; pig ball injector means connected to said body and communicating with said valve chamber through said valve seal; and valve means carried by said support and movable to a seated position permitting flow through said chamber and preventing the injection of a pig ball into said valve chamber and to an unseated position permitting flow through said chamber and the injection of a pig ball into said chamber through said seat; said pig ball injector means including means for injecting a pig ball therefrom into said valve chamber.

2. A pig ball injector device comprising: a body having a valve chamber therein; said body having means connectable to flow lines leading into and out of said valve chamber; a valve support at one side of said valve chamber; said body having a valve seat at the other side of said valve chamber; a valve shiftably carried by said support and movable into engagement with the seat; and pig ball injector means removably carried by said body in alignment with said valve and in communication with said valve chamber through said valve seat, operable for injecting a pig ball into said valve chamber when said valve is retracted from said seat.

3. A pig ball injector device comprising: a body having a valve chamber therein; said body having means connectable to flow lines leading into and out of said valve chamber; said body having a valve support at one side of said valve chamber and a valve seat at the other side of said valve chamber; a valve shiftably carried by said support and movable into engagement with the seat; a pig ball injector removably carried by said body in alignment with said valve; said pig ball injector means including a housing having a chamber therein; spring urged follower means disposed in said injector housing for injecting a pig ball into said valve chamber when said valve is retracted from said seat; and said injector housing communicating with said valve chamber through said valve seat.

4. A pig ball injector device comprising: a body having a valve chamber therein; said body having means connectable to flow lines leading into and out of said valve chamber; said body having a valve support at one side of said valve chamber and a valve seat at the other side of said valve chamber; a valve shiftably carried by said support and movable into engagement with the seat; a pig ball injector removably carried by said body in alignment with said valve; said pig ball injector means including a housing having a chamber therein; spring urged follower means disposed in said injector housing for injecting a pig ball into said valve chamber when said valve is retracted from said seat; said follower means having a follower disc having means for permitting fluid to pass therepast and act on opposite sides of the disc; and said injector housing communicating with said valve chamber through said valve seat.

5. A pig ball injector device comprising: a body having a valve chamber therein; said body having means connectable to flow lines leading into and out of said valve chamber; said body having a valve support at one side of said valve chamber and a valve seat at the other side of said valve chamber; a valve shiftably carried by said support and movable into engagement with the seat; a pig ball injector removably carried by said body in alignment with said valve; said pig ball injector means including a housing having a chamber therein; spring urged follower means disposed in said injector housing for injecting a pig ball into said valve chamber when said valve is retracted from said seat; said follower means including a disc shiftable and loosely fitting in said housing; and said injector housing communicating with said valve chamber through said valve seat.

6. A pig ball injector device comprising: a body having a valve chamber therein; said body having means connectable to flow lines leading into and out of said valve chamber; said body having a valve support at one side of said valve chamber and a valve seat at the other side of said valve chamber; a valve shiftably carried by said support and movable into engagement with seat; a pig ball injector removably carried by said body in alignment with said valve; said pig ball injector means including a housing having a chamber therein; spring urged follower means disposed in said injector housing for injecting a pig ball into said valve chamber when said valve is retracted from said seat; said injector housing communicating with said valve chamber through said valve seat; and a vent valve in said injector housing.

References Cited in the file of this patent

UNITED STATES PATENTS

| | | |
|---|---|---|
| 2,786,219 | Meyer | Mar. 26, 1957 |
| 2,881,752 | Blahnik | Apr. 14, 1959 |
| 2,893,028 | Scaramucci | July 7, 1959 |

FOREIGN PATENTS

| | | |
|---|---|---|
| 262,639 | Switzerland | Oct. 1, 1949 |

UNITED STATES PATENT OFFICE
CERTIFICATE OF CORRECTION

Patent No. 2,977,617                                April 4, 1961

Robert S. Willis

It is hereby certified that error appears in the above numbered patent requiring correction and that the said Letters Patent should read as corrected below.

Column 3, line 75, for "valve seal" read -- valve seat --.

Signed and sealed this 10th day of October 1961.

(SEAL)
Attest:

ERNEST W. SWIDER                                DAVID L. LADD
Attesting Officer                                   Commissioner of Patents

USCOMM-DC